Sept. 18, 1951 C. E. TORSCH ET AL 2,568,471

ELECTROMAGNETIC SCANNING SYSTEM

Filed Nov. 10, 1949 2 Sheets-Sheet 1

Inventors:
Charles E. Torsch,
John B. Coullard,
by Merton D. Morse
Their Attorney.

Inventors:
Charles E. Torsch,
John B. Coullard,
by Merton D. Moore
Their Attorney.

Patented Sept. 18, 1951 2,568,471

UNITED STATES PATENT OFFICE 2,568,471

ELECTROMAGNETIC SCANNING SYSTEM

Charles E. Torsch and John B. Coullard, North Syracuse, N. Y., assignors to General Electric Company, a corporation of New York Application November 10, 1949, Serial No. 126,630

7 Claims. (Cl. 315—27)

Figure 1:
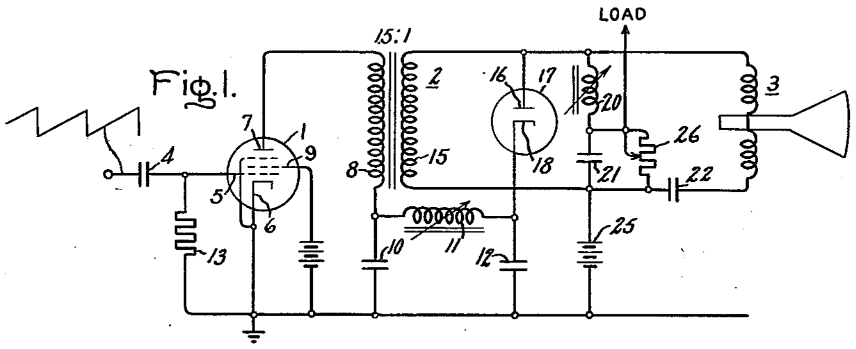

Our invention relates to electromagnetic scanning systems, and more particularly to electromagnetic systems of the type which employ a sweep output transformer connecting a driver tube with a scanning inductance. In such systems, the electron scanning beam of the cathode ray tube is electromagnetically deflected cyclically to effect the reproduction of an image. It is a primary object of our invention to increase the electromagnetic scanning power efficiency of such a system with a given volume of transformer core material.

Electromagnetic scanning systems of the above type frequently include a power output device which is connected to supply cyclically varying current through a sweep output transformer to a scanning inductance which surrounds the neck of the cathode ray viewing device. It is known in such scanning systems to employ a damping tube which is connected across the secondary of the sweep output transformer and which may be utilized to provide a power feedback circuit for the sweep output tube. Such a power feedback system, for example, is disclosed in U. S. Patent 2,451,641, granted October 19, 1948 to C. E. Torsch. In such an arrangement, the magnetic sweep energy accumulated during the latter half of the trace interval and stored in the scanning inductance during the retrace periods of the scanning beam causes a current flow through the damper tube during the initial portion of the subsequent scanning period. If the damper tube and driver tube currents are approximately equal, the two devices may be cross connected so as to obtain a power feedback effect with consequent increase in the efficiency of the system. The damper tube current is combined with the current output of the power tube to effect substantially linear beam trace upon the cathode ray tube screen. Such arrangements ideally utilize a sweep transformer wherein a step down ratio of approximately 1.5 to 1 is optimum and wherein the rectified components of primary and secondary current are approximately equal so as to accomplish the above-mentioned cross connection.

We have found that such systems do not make full use of the capabilities of the core material in the sweep transformer, due to the fact that a flux biasing effect is produced in the transformer core as a result of an unbalance in the primary and secondary magnetizing force set up in the transformer core. The flux biasing effect causes the operating point of the transformer core to be shifted by a substantial amount which means that a substantially increased driving power must be supplied to obtain the desired deflection of the electron beam in the regions of core saturation. The BH curves of many core materials employed in sweep transformers, such as, for example, the ferrite magnetic core material disclosed in the copending application of C. E. Torsch, Serial No. 95,852, which was filed on May 27, 1949 and is assigned to the same assignee as the present invention, are of the steep slope variety and hence are sensitive to relatively small components of net D.-C. core magnetization. The above-described restriction of positive flux excursion relative to negative flux excursion for balanced magnetizing force excursions results in an appreciable compression of the right-hand picture elements and decentering of the picture raster vertical edges toward the left-hand side of the screen. This condition is particularly apparent when the volume of core material is reduced to an economic minimum for the level of energy required to feed the scanning inductance.

We have found that undesirable core saturating effects experienced in conventional electromagnetic deflection systems may be substantially eliminated by introducing a compensating current in the transformer which operates to shift the operating point of the transformer core to a more symmetrical position on the BH curve thereof. Accordingly, it is an object of our invention to provide a new and improved electromagnetic scanning system in which substantially increased efficiency is obtained.

It is another object of our invention to provide a new and improved electromagnetic scanning system wherein a sweep transformer having a relatively small volume of core material may be employed without sacrificing a previously established level of power transfer efficiency.

It is a further object of our invention to provide a new and improved electromagnetic scanning system in which a sweep transformer having a given volume of core material is able to produce a substantially increased amount of electromagnetic deflection energy.

Briefly, in accordance with our invention, the operating point of the sweep output transformer is shifted by means of an auxiliary unidirectional current which is passed through a winding of the sweep transformer in the proper direction to provide sufficient additional magnetizing force to balance the unidirectional component of magnetizing force set up by the flow of current through the primary winding. In a preferred embodiment, such auxiliary current is drawn off through a shunt connected width control thereby producing relatively little displacement of the picture for the same change in linearity of the scanning wave form as would be produced by direct connection to the sweep yoke. Raster decentering may be independently accomplished by well-known auxiliary magnetic means such as focus coil tilt and/or displacement, or centering ring magnets.

Figure 2:
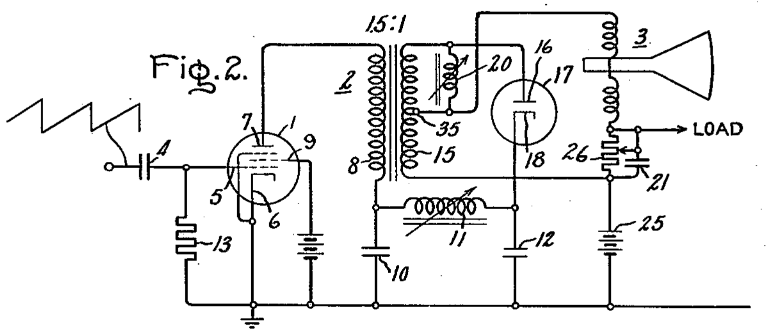
Figure 3:
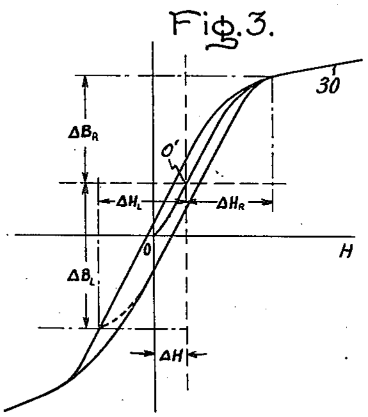
Figure 4:
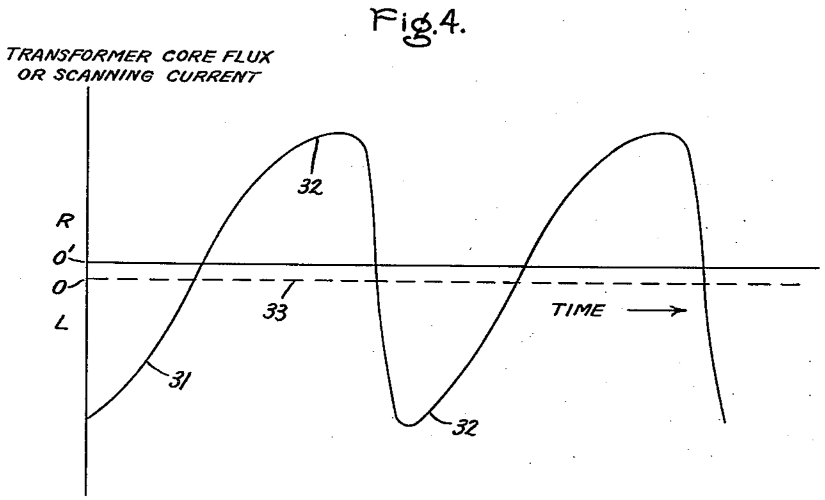
Figure 5:
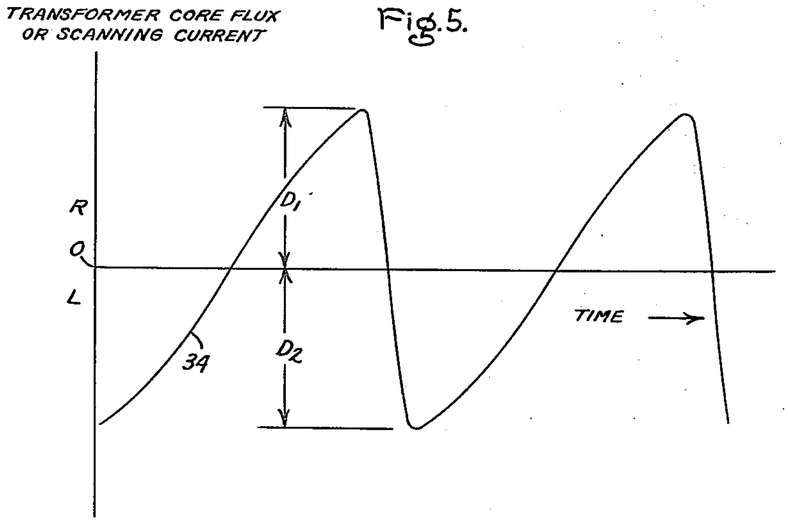

The features of our invention which we believe to be novel are set forth with particularlity in the appended claims. Our invention itself, however, both as to its organization and method of operation, together with further objects and advantages thereof, may best be understood by reference to the following description taken in connection with the accompanying drawing, in which Fig. 1 is a schematic diagram of an electromagnetic deflection circuit embodying the principles of our invention; Fig. 2 is a schematic diagram of an electromagnetic deflection circuit embodying the principles of our invention in alternative form; Fig. 3 is a characteristic curve for a portion of the apparatus of Fig. 1, used to illustrate the operation thereof; and Figs. 4 and 5 are waveforms for a portion of the circuit of Fig. 1.

Referring now more particularly to Fig. 1 of the drawing, there is illustrated therein a power output tube 1, which is used to control the flow of sweep energy through a sweep output transformer 2. The sweep transformer 2 is connected to the coils of a scanning inductance 3 which may be in the form of a conventional scanning yoke which surrounds the neck of a cathode ray tube and operates electromagnetically to deflect the electron beam of the cathode ray tube. A voltage wave of the desired sawtooth shape is applied through a capacitor 4 to the control electrode 5 of device 1. The cathode 6 of device 1 is connected to ground and the anode 7 of device 1 is connected to one end of primary winding 8 of sweep transformer 2. The other end of primary winding 8 is connected to a capacitor 10 and inductance 11. The screen electrode 9 of device 1 is energized by a separate source of unidirectional potential under the condition of operation shown in Fig. 1. Inductance 11 is preferably made variable by means of a conventional tuning slug of powdered iron, ferrite magnetic material, or the like. The other end of inductance 11 is connected to a capacitor 12, capacitors 10 and 12 also being connected to ground. A grid leak resistor 13 is used to complete the control electrode path of device 1. One end of the secondary 15 of sweep output transformer 2 is connected to the anode 16 of an electron discharge device 17 of the diode type. The cathode 18 of device 17 is connected to the junction point of inductance 11 and capacitor 12. The secondary winding 15 is also connected to an auxiliary isolating inductance 20, which may be constituted as a width control inductance preferably made variable by means of a movable core of powdered iron, ferrite magnetic material, or the like, the other end of D.-C. load isolating inductance 20 being connected through a capacitor 21 to the other end of secondary winding 15. A variable resistor 26 is connected across capacitor 21, this resistor being used to control the flow of current through secondary 15 in a manner to be described more fully hereinafter. A blocking capacitor 22 is used to connect the lower end of the scanning inductance 3 to the lower end of secondary winding 15. Anode potential for device 1 is supplied by a unidirectional source of supply indicated by the battery 25, the positive terminal of which is connected to the lower end of secondary winding 15.

Considering now the operation of the above-described electromagnetic deflection system, a sawtooth scanning waveform is supplied to the control electrode 5 of device 1 and operates to control the flow of current therethrough so as to produce in the primary winding 8 a current of substantially sawtooth shape. However, due to the operation of the damping tube 17, the current through primary winding 8 is substantially class B, that is, no current flows in the winding during approximately the first third of the picture trace interval. During the balance of the trace a plate current of triangular shape rises to a peak of about three times the average or unidirectional component thereof. Likewise the secondary current waveform is substantially class B, beginning with a peak current at the initiation of the picture trace and decreasing to zero near the center of the trace. The magnetizing force in the core produced by the unidirectional component of the primary current tends to allow saturation of the core during peak current intervals.

Due to the action of the damper tube 17, a unidirectional component of secondary current is established, which unidirectional component is utilized in the power feedback system shown to increase the over-all circuit efficiency. Thus, energizing potential for device 1 is supplied through battery 25 and the secondary winding 15, through the damping tube and isolating inductance 11 to the high potential end of primary winding 8. By such an arrangement, the unidirectional component produced by the damping tube is added to the battery potential for energization of device 1.

Inasmuch as the unidirectional component of current which flows through secondary winding 15 due to the damper and yoke load is, by feedback connection, the same as the rectified component of anode current which flows through primary winding 8, it would appear that the magnetizing force produced by the flow of current through windings 8 and 15 would be equal and therefore the net magnetic force due to the unidirectional components of the currents would be equal and hence the operating point of the transformer would be symmetrically positioned on the B/H curve of the transformer core material. However, due to the core and copper losses in the scanning inductance 3, driver tube 1 and isolating inductance 20, and due to leakage reactance, core and copper losses within the transformer itself, a stepdown ratio between primary winding 8 and secondary winding 15 of approximately 1.5 to 1 has been found optimum for highest efficiency and best cathode ray trace linearity with substantially unidirectional feedback of secondary damping energy to the primary.

With such a stepdown ratio, the ampere turns, and hence the magnetizing forces produced by the two windings, are unequal, the primary ampere turns being substantially greater than the secondary ampere turns. This means that the magnetizing force produced by the primary current is substantially greater than the secondary magnetizing force and there is produced in the core material a constant unidirectional magnetizing force which biases the operating point of the transformer away from the geometric center of the family of B/H curves of the core material. The net effect of this magnetic bias is to offset the raster to the left on the cathode ray tube screen, an indication that the core is responding unequally to the primary and secondary peak currents due to the saturation effects produced during operation at one end of the B/H curve.

To restore the raster to a center position on the cathode ray tube face (and the transformer core to an unbiased flux state), an additional unidirectional component of secondary current must be established so as to balance the effect of the primary unidirectional current component.

In order to illustrate more clearly the saturation effects produced in conventional electromagnet deflection systems, wherein it is necessary to utilize a stepdown ratio between primary and secondary windings of a sufficient value to give unbalance in primary and secondary magnetizing forces, there is illustrated in Fig. 3 a typical B/H curve of the core material of a conventional sweep output transformer. In Fig. 3, the generalized B/H curve of the core material is illustrated by the curve 30, which under static conditions starts at the intersection of the B and H axes. Due to the above-described flux biasing effect, the operating point is shifted by an amount $\Delta H$ to a new position illustrated as O'. With the new operating point O' as a center, the core is now subjected to equal magnetizing forces $\Delta H_R$ and $\Delta H_L$ which correspond respectively to deflection of the cathode ray beam to the right-hand and left-hand edges of the screen and which cause corresponding flux variations $\Delta B_R$ and $\Delta B_L$ respectively. These flux variations $\Delta B_R$ and $\Delta B_L$ are reflected as corresponding deflections of the cathode ray beam to the right-hand and left-hand edges of the screen respectively. However, it is apparent from an inspection of Fig. 3 that the flux excursions $\Delta B_R$ and $\Delta B_L$ are not equal although they are produced from identical magnetizing force excursions $\Delta H_R$ and $\Delta H_L$, due to the saturation effects of the core. Thus, to obtain a linear output the core must be greatly overdriven or else the output of the transformer must be severely limited for a given volume of core material.

To illustrate further the effects of core saturation on the shape of the output wave of the deflection system, we have shown in Fig. 4 a timing waveform of the current produced in the scanning inductance 3 of Fig. 1. This waveform also illustrates the variations in transformer core flux density B and may be used to correlate the deflection of the cathode ray beam and the transformer operating characteristic.

Referring to Fig. 4, the sawtooth wave of scanning current 31 is flattened in the region of transformer core saturation 32 which results in an undesirable compression of the right-hand picture elements on the raster. Also, due to the unequal deflections about the biased operating point O', which also corresponds to the undeflected spot position on the cathode ray tube screen, the edges of the raster 32 are decentered toward the left-hand edge of the screen. This is at once evident from a consideration of the neutral transformer core position O, illustrated by the dotted line 33, which is spaced below the actual operating point O' by the amount of the core flux bias and which would ideally correspond to the undeflected spot position.

In accordance with our invention, an auxiliary unidirectional current is passed through the secondary winding in the proper direction to create a new magnetizing force which opposes the biasing force $\Delta H$ of Fig. 3 and shifts the operating point to a more symmetrical position as the B/H curve. By such an arrangement, a substantially greater deflection is permitted before the core becomes saturated. The effect of operation of the transformer core at its neutral flux position O is illustrated in Fig. 5 wherein the scanning current waveform thus obtained is shown. In Fig. 5, it is evident that the scanning waveform 34 undergoes equal excursions $D_1$ and $D_2$ from the neutral position O, which position also corresponds to the undeflected position of the cathode ray beam. The amplitude of wave 34 is increased due to the operation of the transformer in an unsaturated region and linearity is substantially improved over that of Fig. 4. Also, no crowding of the right-hand picture elements is produced with the symmetrical scanning wave of Fig. 5.

In the circuit of Fig. 1, the compensating component of secondary current necessary to obtain unbiased transformer core operation is produced by connecting an auxiliary load circuit to the junction point of shunt width control 20 and capacitor 21. The auxiliary load may comprise any power consuming circuit in the receiver such as, for example, the audio output stage, the video output stage, or the vertical deflection circuit. It will be understood that the other terminal of the auxiliary load is connected to ground so as to draw an additional current from the supply 25 through the secondary 15 and isolating inductance 20. The adjustable resistor 26 across by-pass capacitor 21 operates to shunt a variable amount of current directly to the auxiliary load circuit and may be used to obtain various degrees of linearity to offset transmitted defects in camera sweep linearity.

By such an arrangement, the additional current may be passed through secondary winding 15 without disturbing substantially the conditions in scanning yoke 3 so that an additional raster centering means is not required during adjustment of the current drawn by the auxiliary load in the vicinity of ideal linearity of sweep. The reactance of the shunt inductance 20 operates to isolate the alternating current loading effect of the auxiliary load. Thus, connection of the auxiliary load to the lower end of isolating inductance 20 produces least displacement of the raster for the same change in linearity of the scanning waveform. Additional picture information centering effects may be required to offset synchronizing phase delay or to secure equality of residual blanking margins.

In the event that electrical centering is already employed in the receiver, the alternative circuit shown in Fig. 2 may be utilized. In Fig. 2, corresponding elements have been indicated by the same reference numerals and a detailed description thereof is considered unnecessary herein. In the circuit of Fig. 2, the shunt width control 20 is illustrated as connected between a tap 35 on secondary winding 15 and one end thereof, the scanning yoke 3 being connected in series with a variable resistor 26 between tap 35 and the other end of secondary winding 15. Variable resistor 26, which is in series with the scanning inductance 3, is an electrical centering control and operates to vary the unidirectional component of current flowing through the scanning inductance 3. It will be understood that a unidirectional current flowing through scanning inductance 3 produces a constant deflection of the electron beam of the cathode ray tube in a direction determined by the polarity of the unidirectional current.

In the circuit of Fig. 2, the additional increment of secondary current necessary to produce a subtractive magnetizing force is supplied by an auxiliary load circuit which is connected to the lower end of scanning inductance 3. The auxiliary load may again comprise any power consuming circuit in the receiver which will draw the value of current necessary to produce the demagnetizing balancing force ΔH. In operation, the circuit of Fig. 1 reduces the raster centering action produced by adjustment of resistor 26 of Fig. 2, but similar adjustment of the circuit of Fig. 2 may be accompanied by a change in linearity and amplitude of the scanning waveform. However, changes in the linearity may be substantially compensated for by readjustment of the linearity control inductance 11. Also, changes in the amplitude of the scanning waveform may be compensated for by readjustment of width control 20.

If the value of resistor 26 is decreased, as by moving the tap thereof toward the supply 25, the amplitude of the scanning waveform decreases correspondingly due to the decreased load across that portion of the secondary winding 15. Such a change in amplitude may be compensated for by readjustment of width control inductance 20.

If the picture centering is set to the right, as by raising the tap on resistor 26, the unidirectional current drawn through the scanning inductance 3 and secondary 15 is increased and the value of the width control inductance 20 in decreased to reduce the increased amplitude of the scanning waveform.

In either the arrangement of Fig. 1 or Fig. 2, there is employed the circulation of a unidirectional current through the secondary winding of the sweep transformer so that the magnetizing force of the primary and secondary windings is approximately balanced. With the adjustment of combined current excursions to secure raster centering and desired sweep width, relatively little effect upon the sweep linearity is experienced in our arrangement.

It is an important feature of our invention that the efficiency of the electromagnetic deflection circuit is substantially increased over previous systems of this character due to the fact that the full capabilities of the transformer core material are realized. Thus, by our arrangement, a sweep output transformer having a substantially reduced volume of core material may be made to produce the same output of electromagnetic scanning energy as conventional sweep transformers many times greater in size. Also, with the advent of cathode ray tubes of increased sweep angle and higher rating of insulation, which require increased electromagnetic deflection energy and high voltage supply, our improved electromagnetic deflection system enables present-day circuits to be modified so as to provide the required increase in sweep energy and anode potential without any substantial change in the elements of the existing system.

While our invention has been described by reference to particular embodiments thereof, it will be understood that numerous modifications may be made by those skilled in the art without departing from the invention. We therefore aim in the appended claims to cover all such equivalent variations as come within the true spirit and scope of our invention.

What we claim as new and desire to secure by Letters Patent of the United States is:

1. In an electromagnetic scanning circuit of the type employing a sweep transformer having a ferromagnetic core surrounded by primary and secondary windings and also employing power supply means for passing continuous unidirectional currents through said two windings which produce unequal opposing fluxes, whereby said transformer core tends to be operated at a point unsymmetrically positioned on the B/H curve of said core, means for increasing the linearity and efficiency of said transformer comprising an auxiliary direct current load circuit connected in series with said secondary winding, said load circuit having a predetermined admittance value sufficient to cause an additional component of continuous unidirectional current to flow through said secondary winding of proper polarity and of magnitude sufficient to equalize said fluxes, thereby to shift the operating point of said core substantially to the center of the B/H curve thereof.

2. In an electromagnetic scanning circuit of the type employing a sweep transformer having a ferromagnetic core surrounded by primary and secondary windings and also employing power supply means for passing continuous unidirectional currents through said windings so proportioned that the magnetizing force produced by flow of current through said primary winding normally exceeds the magnetizing force produced by flow of current through said secondary winding by a predetermined amount, means for substantially increasing the efficiency of said electromagnetic scanning circuit comprising an auxiliary direct current load circuit connected in series with said secondary winding, said load circuit having a predetermined admittance value selected to cause an additional component of continuous unidirectional current to flow therein of such magnitude that an additional magnetizing force of said predetermined amount is established in said secondary winding, whereby the operating point of said transformer core is positioned substantially in the center of the B/H curve thereof.

3. An electromagnetic deflection circuit comprising, a sweep transformer having primary and secondary windings associated therewith, an electron discharge device having an output electrode connected to one end of said primary winding and a cathode connected to a point of common reference potential, means for controlling the flow of current through said device and said primary winding in accordance with a scanning wave of desired waveform, a primary load circuit including a deflecting coil connected in circuit with said secondary winding, a rectifier, means including said rectifier for cross connecting one end of said secondary winding and the other end of said primary winding, a source of unidirectional potential having one terminal connected to the other end of said secondary winding and the other terminal connected to said reference point, an inductance having one terminal connected to said one end of said secondary winding, and an auxiliary load circuit connected across said source through said inductance and said secondary winding, said auxiliary load circuit having admittance value such that the total magnetizing forces produced by flow of unidirectional current from said source through said primary and secondary windings are substantially equal.

4. An electromagnetic deflection circuit comprising, a sweep transformer having primary and secondary windings associated therewith, an electron discharge device having an output electrode connected to one end of said primary winding and a cathode connected to a point of common reference potential, means for controlling the flow of current through said device and said primary winding in accordance with a scanning wave of desired waveform, a primary load circuit including a deflecting coil connected in circuit with said secondary winding, a rectifier, means including said rectifier for cross connecting one end of said secondary winding and the other end of said primary winding, a source of unidirectional potential having one terminal connected to the other end of said secondary winding and the other terminal connected to said reference point, and an auxiliary load circuit connected across said source through said secondary winding, and a resistance connected in circuit with said source and said auxiliary load circuit, said auxiliary load circuit and said resistance having a combined admittance value such that the magnetizing forces produced by flow of unidirectional currents through said primary and secondary windings are substantially equal.

5. An electromagnetic deflection circuit comprising, a sweep transformer having primary and secondary windings associated therewith, an electron discharge device having an output electrode connected to one end of said primary winding and a cathode connected to a point of common reference potential, means for controlling the flow of current through said device and said primary winding in accordance with a scanning wave of desired waveform, a primary load circuit including a deflecting coil connected in circuit across said secondary winding, a rectifier, means including said rectifier for cross connecting one end of said secondary winding and the other end of said primary winding, a source of unidirectional potential having one terminal connected to the other end of said secondary winding and the other terminal connected to said reference point, an isolating inductance having one terminal connected to said one end of said secondary winding, an auxiliary load circuit connected across said source through said inductance and said secondary winding, and a shunt resistance connected between one terminal of said source and said load circuit, said resistance being variable, whereby flow of current through said secondary winding to said load circuit may be varied, said auxiliary load circuit having a predetermined admittance so selected that the magnetizing forces produced by flow of unidirectional currents through said primary and secondary windings may be substantially equalized by adjustment of said resistance.

6. An electromagnetic deflection circuit comprising, a sweep transformer having primary and secondary windings associated therewith, an electron discharge device having an output electrode connected to one end of said primary winding and a cathode connected to a point of common reference potential, means for controlling the flow of current through said device and said primary winding in accordance with a scanning wave of desired waveform, a rectifier, means including said rectifier for cross connecting one end of said secondary winding and the other end of said primary winding, a source of unidirectional potential having one terminal connected to the other end of said secondary winding and the other terminal connected to said reference point, a scanning inductance connected to said one end of said secondary winding, and a load circuit connected across said source through said inductance and said secondary winding, said load circuit having a predetermined admittance value such that the magnetizing forces produced by flow of unidirectional currents through said primary and secondary windings are substantially equal.

7. An electromagnetic deflection circuit comprising, a sweep transformer having primary and secondary windings associated therewith, an electron discharge device having an output electrode connected to one end of said primary winding and a cathode connected to a point of common reference potential, means for controlling the flow of current through said device and said primary in accordance with a scanning wave of desired waveform, a rectifier, means including said rectifier for cross connecting one end of said secondary winding and the other end of said primary winding, a source of unidirectional potential having one terminal connected to the other end of said secondary winding and the other terminal connected to said reference point, a scanning inductance connected in circuit with said secondary winding, a direct current load circuit of predetermined impedance connected across said source through said secondary winding, and a resistance connected in circuit with said source and said load circuit, said resistance being variable, whereby flow of current through said secondary winding to said auxiliary load circuit may be varied, said auxiliary load circuit having a predetermined admittance so selected that the magnetizing forces produced by flow of unidirectional currents through said primary and secondary windings may be adjusted to be substantially equal by adjustment of said resistance.

CHARLES E. TORSCH.
JOHN B. COULLARD.

REFERENCES CITED

The following references are of record in the file of this patent:

UNITED STATES PATENTS

| Number | Name | Date |
|---|---|---|
| 2,443,030 | Foster | June 8, 1948 |
| 2,460,601 | Schade | Feb. 1, 1949 |
| 2,466,537 | De Vore | Apr. 5, 1949 |
| 2,474,474 | Friend | June 28, 1949 |
| 2,478,744 | Clark | Aug. 9, 1949 |